(12) United States Patent
Aoki et al.

(10) Patent No.: US 12,341,194 B2
(45) Date of Patent: Jun. 24, 2025

(54) ELECTRODE FOR POWER STORAGE DEVICES AND LITHIUM-ION SECONDARY BATTERY

(71) Applicant: TDK Corporation, Tokyo (JP)

(72) Inventors: Takuya Aoki, Tokyo (JP); Shuji Higashi, Tokyo (JP); Miyuki Yanagida, Tokyo (JP); Makoto Endo, Tokyo (JP); Yoshihiro Kanbayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 638 days.

(21) Appl. No.: 17/634,352

(22) PCT Filed: Mar. 29, 2021

(86) PCT No.: PCT/JP2021/013369
§ 371 (c)(1),
(2) Date: Feb. 10, 2022

(87) PCT Pub. No.: WO2022/208625
PCT Pub. Date: Oct. 6, 2022

(65) Prior Publication Data
US 2023/0361299 A1    Nov. 9, 2023

(51) Int. Cl.
*H01M 4/583*    (2010.01)
*G01N 23/2055*   (2018.01)
(Continued)

(52) U.S. Cl.
CPC .......... *H01M 4/583* (2013.01); *H01M 4/667* (2013.01); *H01M 10/0525* (2013.01); *G01N 23/2055* (2013.01)

(58) Field of Classification Search
CPC .. H01M 4/583; H01M 4/667; H01M 10/0525; H01M 4/366; H01M 4/661;
(Continued)

(56) References Cited

U.S. PATENT DOCUMENTS

| | | | |
|---|---|---|---|
| 2006/0099493 A1 | 5/2006 | Nishimura et al. | |
| 2010/0209773 A1* | 8/2010 | Sakashita ............ | H01M 10/052 29/623.3 |
| 2020/0373584 A1 | 11/2020 | Morin et al. | |

FOREIGN PATENT DOCUMENTS

| | | |
|---|---|---|
| JP | 2004-253143 A | 9/2004 |
| JP | 2009-146752 A | 7/2009 |

(Continued)

OTHER PUBLICATIONS

T. Himuro et al.; "Thermal Stability and Internal Stress for Strongly Oriented (111) Cu Films"; J. Japan Inst. Metals; 2003; vol. 67; No. 7; pp. 342-347.
(Continued)

*Primary Examiner* — Lisa S Park
(74) *Attorney, Agent, or Firm* — Oliff PLC

(57) ABSTRACT

An electrode for power storage devices includes: a resin layer; a conductive layer containing copper and being disposed on the resin layer; and an active material layer containing graphite and being disposed on the conductive layer, wherein when measured by an X-ray diffraction method from a surface of the active material layer, a peak intensity ratio A/B between an intensity A at a highest X-ray diffraction peak in a range where a diffraction angle is 48° or more and 53° or less and an intensity B at a highest X-ray diffraction peak in a range where a diffraction angle is 52° or more and 57° or less satisfies Expression (1): 0.3≤A/B≤1 (1).

12 Claims, 5 Drawing Sheets

(51) Int. Cl.
*H01M 4/66* (2006.01)
*H01M 10/0525* (2010.01)
(58) Field of Classification Search
CPC ........ H01M 4/133; H01M 4/587; H01M 4/66; H01M 10/05; G01N 23/2055; Y02E 60/10
See application file for complete search history.

(56) References Cited

FOREIGN PATENT DOCUMENTS

| | | |
|---|---|---|
| JP | 2010-040488 A | 2/2010 |
| JP | 2010-040489 A | 2/2010 |
| JP | 2014-075191 A | 4/2014 |

OTHER PUBLICATIONS

K. Tamakawa et al.; "Effect of Micro Texture of Electroplated Copper Thin Films"; Journal of the Society of Materials Science, Japan; 2007; vol. 56; No. 10; pp. 907-912.

\* cited by examiner

ELECTRODE FOR POWER STORAGE DEVICES AND LITHIUM-ION SECONDARY BATTERY

TECHNICAL FIELD

The present disclosure relates to an electrode for power storage devices and a lithium-ion secondary battery.

BACKGROUND ART

It has been proposed to use a composite material having conductive layers formed on both sides of a resin film as a current collector of a secondary battery. Patent Document No. 1 identified below discloses an electrode for a secondary battery in which such a composite material is used for the current collector.

CITATION LIST

Patent Literature

Patent Document No. 1: Japanese Laid-Open Patent Publication No. 2014-75191

SUMMARY OF INVENTION

Technical Problem

With power storage devices such as lithium-ion secondary batteries, there is a demand for further improvement in rate characteristic. One embodiment of the present disclosure provides an electrode for power storage devices capable of improving the rate characteristic of a power storage device.

Solution to Problem

An electrode for power storage devices according to an embodiment of the present disclosure includes: a resin layer; a conductive layer containing copper and being disposed on the resin layer; and an active material layer containing graphite and being disposed on the conductive layer, wherein when measured by an X-ray diffraction method from a surface of the active material layer, a peak intensity ratio A/B between an intensity A at a highest X-ray diffraction peak in a range where a diffraction angle (2θ) is 48° or more and 53° or less and an intensity B at a highest X-ray diffraction peak in a range where a diffraction angle (2θ) is 52° or more and 57° or less satisfies Expression (1) below:

$$0.3 \leq A/B \leq 1 \qquad (1).$$

Advantageous Effects of Invention

According to an embodiment of the present disclosure, there is provided an electrode for power storage devices capable of improving the rate characteristic of a power storage device.

DESCRIPTION OF EMBODIMENTS

Figure 1:
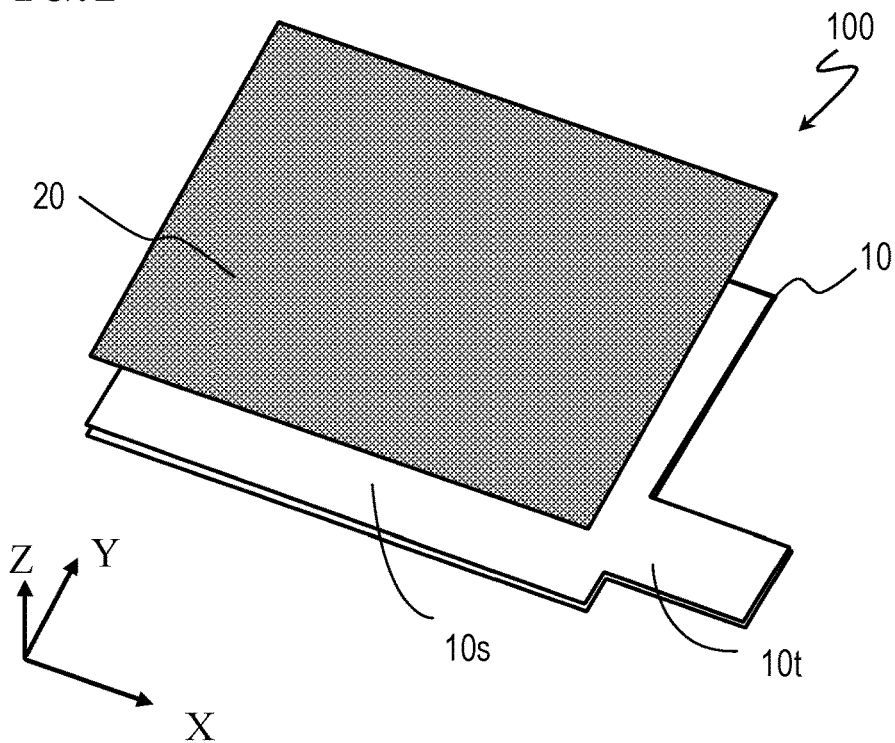
FIG. 1 is a schematic exploded perspective view showing an example of an electrode for power storage devices of the present embodiment.

The conductive layer of a current collector including a resin film and a conductive layer, as proposed in Patent Document No. 1, differs from a metal foil that is conventionally used alone as a current collector in terms of thickness and manufacturing method, and there has been no report on what kind of conductive layer is appropriate for improving the charging/discharging characteristic of a power storage device. In view of such points, we focused on the crystallinity of the conductive layer of the current collector including a resin film and a conductive layer, arriving at an electrode for power storage devices and a lithium-ion secondary battery capable of improving the rate characteristic.

Embodiments of the electrode of a power storage device and the lithium-ion secondary battery of the present embodiment will now be described with reference to the drawings. The numerals, shapes, materials, steps and the order of the steps presented in the following description are only examples, and various modifications are possible as long as there is no technical contradiction. The embodiments to be described below are merely illustrative, and various combinations are possible as long as there is no technical contradiction.

The respective dimensions, shapes, etc., of the members shown in the drawings of the present disclosure may be exaggerated for the sake of discussion. In the drawings of the present disclosure, some members may be taken out or some elements may be omitted from the drawings in order to avoid excessive complexity. Therefore, the respective dimensions of and the arrangement between members shown in the drawings of the present disclosure may not reflect the respective dimensions of and the arrangement between members in an actual device. The terms "perpendicular" and "orthogonal" in the present disclosure are not limited to two lines, edges, surfaces, etc., being at an angle of 90° in a strict sense, but include cases where the angle is in the range of about ±5° of 90°. The term "parallel" includes cases where two lines, edges, surfaces, etc., are in the range of about ±5° of 0°.

In the present specification, the term "cell" refers to a structure in which at least a pair of positive electrodes, a separator containing at least an electrolyte, and a negative electrode are integrally assembled. The term "battery" in the present specification is used as an inclusive term for various forms such as battery modules, battery packs, etc., having one or more "cells" electrically connected to each other.

First Embodiment

Figure 2:
FIG. 2 is a schematic enlarged cross-sectional view showing a part of the electrode for power storage devices shown in FIG. 1.

FIG. 1 is a schematic exploded view of an example of an electrode for power storage devices of the present embodiment. FIG. 2 is a cross-sectional view of a part of the electrode for power storage devices shown in FIG. 1. In the present specification, for the sake of discussion, arrows indicating three mutually orthogonal directions, i.e., the X, Y and Z directions are shown in the drawings.

An electrode 100 for power storage devices includes a resin layer 11, a conductive layer 12 and an active material layer 20. The resin layer 11 and the conductive layer 12 together form a current collector 10. The current collector 10 includes a first portion 10s and a second portion 10t, and the active material layer 20 is arranged in the first portion 10s. The active material layer 20 is absent in the second portion 10t, and a second portion 10t functions as a tab for electrical connection to the outside. The active material layer 20 includes an active material that is redoxed over the course of charging (or power storing) and discharging. The current collector 10 supports the active material layer 20, supplies electrons to the active material layer 20, and receives electrons from the active material layer 20.

As shown in FIG. 2, the conductive layer 12 is disposed on the resin layer 11, and the active material layer 20 is disposed on the conductive layer 12.

The active material layer 20 includes graphite as a negative electrode active material that absorbs and releases lithium ions. For example, it includes natural or artificial graphite, carbon nanotube, non-graphitizable carbon, graphitizable carbon (soft carbon), low-temperature calcined carbon, etc.

The active material layer 20 may further include a binder, a conductive aid, etc. Substances used for the binder include styrene-butadiene copolymer (SBR), fluororesins such as polyvinylidene di-fluoride (PVDF), polytetrafluoroethylene (PTFE), tetrafluoroethylene-hexafluoropropylene copolymer (FEP), tetrafluoroethylene-perfluoroalkyl vinyl ether copolymer (PFA), ethylene-tetrafluoroethylene copolymer (ETFE), polychlorotrifluoroethylene (PCTFE), ethylene-chlorotrifluoroethylene copolymer (ECTFE) and polyvinyl fluoride (PVF), polyacrylate (PAA), polyamide-imide (PAI), polyimide (PI), etc. The active material layer 20 may include one or two or more of these substances.

Substances that can be used as a conductive aid include a carbon material such as a carbon powder and a carbon nanotube, a metal powder such as nickel, stainless steel and iron, and a conductive oxide powder such as ITO. The active material layer 20 may contain one or two or more of these substances.

In the current collector 10, the conductive layer 12 supplies electrons to the active material layer 20 and also receives electrons from the active material layer 20. The resin layer 11 supports the conductive layer 12.

The conductive layer 12 includes copper. Specifically, the conductive layer 12 includes copper or an alloy of copper and a metal other than copper. The thickness of the conductive layer 12 is preferably 0.2 µm or more and 2.0 µm or less, for example. If the thickness is less than 0.2 µm, the cross-sectional area of the conductive layer 12 becomes too small, resulting in the conductive layer 12 having a high electrical resistance. In view of electrical conductivity, there is no limitation on the thickness of the conductive layer 12. However, if the thickness of the conductive layer 12 is larger than 2.0 µm, the thickness of the current collector 10 as a whole is large. Therefore, when a stacked lithium-ion secondary battery including a plurality of electrode pairs stacked together is constructed, the percentage of portions that do not contribute to energy storage may increase and the energy density may become small. The crystallographic characteristic of the conductive layer 12 will be discussed later.

The conductive layer 12 may include only a layer of copper or copper-containing alloy. In this case, the conductive layer 12 may include one or two or more layers of copper or copper-containing alloy. The conductive layer 12 may also include a layer of copper or copper-containing alloy and one or two or more layers of a metal other than copper or an alloy of a metal other than copper.

The resin layer 11 is insulative and includes a resin. The resin layer 11 may be thermoplastic. Specifically, the resin layer 11 may include at least one of polyethylene terephthalate (PET), polypropylene (PP), polyamide (PA), polyimide (PI), polyethylene (PE), polystyrene (PS), phenolic resin (PF) and epoxy resin (EP).

The thickness of the resin layer 11 is, for example, 3 µm or more and 12 µm or less, preferably 3 µm or more and 6 µm or less. If the thickness of the resin layer 11 is smaller than 3 µm, the strength as a support may be insufficient. If the thickness of the resin layer 11 is greater than 12 µm, the thickness of the current collector 10 as a whole is large. Therefore, when a stacked lithium-ion secondary battery including a plurality of electrode pairs stacked together is constructed, the percentage of portions that do not contribute to energy storage may increase and the energy density may become small.

The current collector 10 may further include an undercoat layer that is located between the resin layer 11 and the conductive layer 12. The undercoat layer may be provided so as to increase the bonding strength between the resin layer 11 and the conductive layer 12 and to reduce the formation of pinholes in the conductive layer. For example, the undercoat layer may be a layer formed from an organic material such as acrylic resin, polyolefin resin, or the like, or a metal-containing layer formed by sputtering.

Next, the structure of the conductive layer 12 will be described based on the crystallographic characteristic. With conventional lithium-ion secondary batteries, an electrolytic copper foil or a rolled copper foil is mainly used as the current collector of the negative electrode. In contrast, with a current collector with a conductive layer formed on a resin film as disclosed in Patent Document 1, the thickness of the conductive layer is generally smaller than the thickness of such a copper foil, making it difficult to use an electrolytic copper foil or a rolled copper foil for the resin film. Therefore, a conductive layer is formed using a thin-film formation technique used in the semiconductor manufacturing technology. However, there are various thin-film formation techniques, and the characteristics of the conductive layer obtained may vary depending on the formation method. Since the thickness of the conductive layer is thin, the characteristics of the conductive layer may vary depending on the thermal history that the conductive layer may undergo during the formation of the active material layer or the formation of the active material layer. Therefore, the present inventor studied in detail the relationship between the crystallinity of the conductive layer in the electrode for power storage devices with the active material layer formed thereon and the rate characteristic of the lithium-ion secondary battery produced using the electrode for power storage devices.

Figure 3:
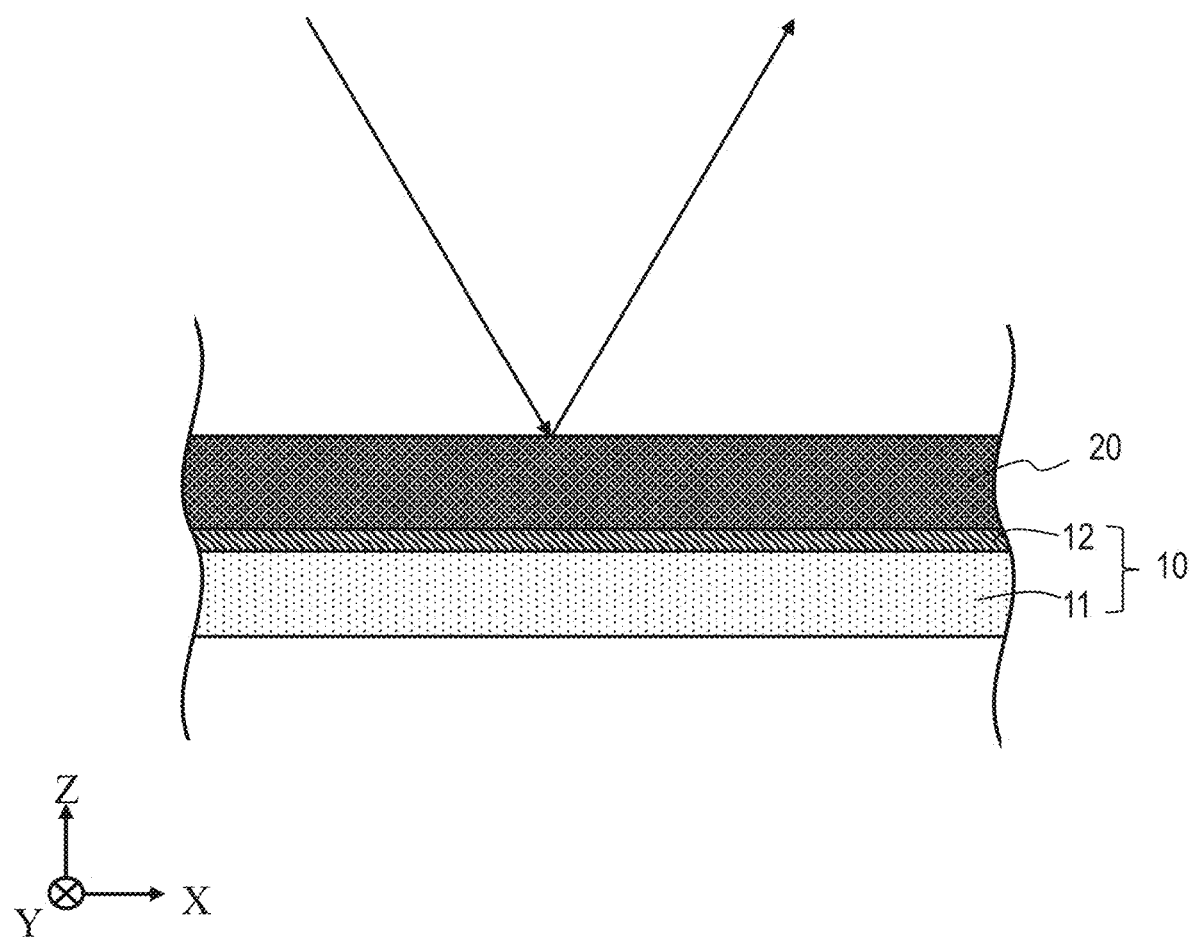
FIG. 3 is a schematic view illustrating a measurement by an X-ray diffraction method.

The evaluation of the crystallinity of the conductive layer was based on the X-ray diffraction method (XRD). As shown in FIG. 3, X-rays were made to be incident upon the surface of the active material layer 20 to measure the intensity of diffracted X-rays. This measurement method is a normal measurement method used for crystallinity evaluation, called "Out of Plane".

Figure 4:
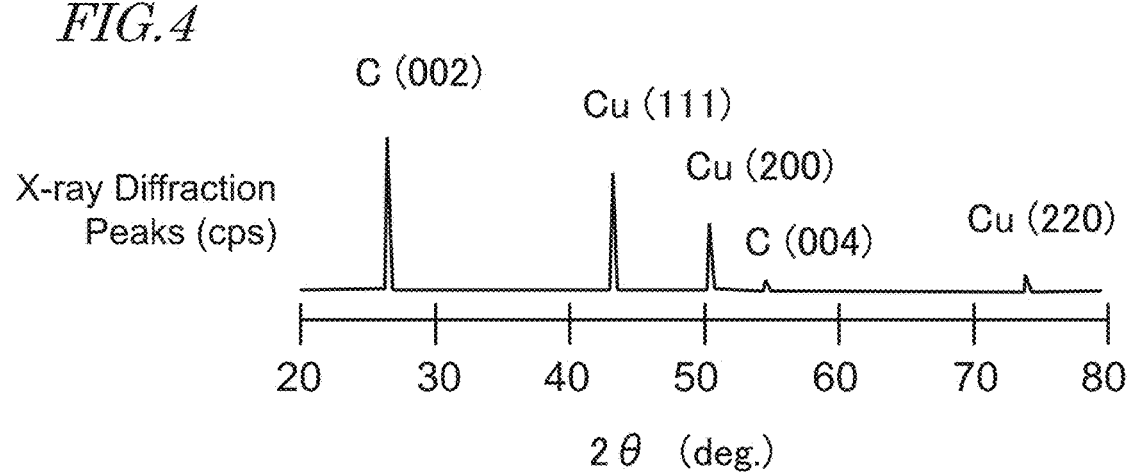
FIG. 4 is a schematic view showing an example of an X-ray diffraction chart of the electrode for power storage devices of the present embodiment.

FIG. 4 shows a schematic example of an X-ray diffraction chart obtained. Major X-ray diffraction peaks shown in Table 1 below are observed. In Table 1, the assignments of the strongest X-ray diffraction peaks observed in diffraction angle ranges in the left column are defined as crystalline phases shown in the right column. The peak assignments were determined with reference to literature values, etc.

The evaluation of the crystallinity of the conductive layer 12 may be performed before the fabrication of the lithium-ion secondary battery. Alternatively, after fabricating the lithium-ion secondary battery and charging/discharging the lithium-ion secondary battery, the lithium-ion secondary battery may be disassembled to evaluate the crystallinity of the conductive layer 12. When the crystallinity of the conductive layer 12 is evaluated after the fabrication and the charging/discharging of the lithium-ion secondary battery, each component of the electrode for power storage devices may possibly be influenced by charging/discharging as the lithium-ion secondary battery is charged/discharged. For example, charging/discharging may insert or release lithium ions into/from the active material layer, which may change the crystal structure of graphite in the active material layer 20. However, even in such a case, the X-ray diffraction peaks of carbon and copper are observed in ranges shown in Table 1, and it can be confirmed that the peaks are of crystal orientations shown on the right side or corresponding to the crystal orientations shown on the right side.

TABLE 1

| Peak position range (2θ) | Peak assignment (Miller index) |
| --- | --- |
| 25° or more and 30° or less | C (002) |
| 41° or more and 46° or less | Cu (111) |
| 48° or more and 53° or less | Cu (200) |
| 52° or more and 57° or less | C (004) |
| 72° or more and 77° or less | Cu (220) |

As shown in Table 1, the carbon peaks are from the graphite of the active material layer 20, and are observed as C(002) and C(004). The copper peaks are from the copper in the conductive layer 12 and are observed as Cu(111), Cu(200), and Cu(220). Among the X-ray diffraction peaks assigned to copper, the peak intensity of Cu(111), which is located in the range of 41° or more and 46° or less at 20, is larger than the peak intensity of Cu(200) and the peak intensity of Cu(220).

As described below, the electrode 100 for power storage devices including the conductive layer 12 was produced under various conditions, and then lithium-ion secondary batteries were produced to measure the discharge rate characteristic thereof. Each measured lithium-ion secondary battery was disassembled after being discharged to the discharge voltage to remove the electrode 100 for power storage devices. The removed electrode 100 for power storage devices was washed with DMC (dimethyl carbonate) and dried, and then the crystallinity of the conductive layer 12 of the electrode 100 for power storage devices was measured by the X-ray diffraction method. As a result, as described above, there was a certain correlation between the discharge rate characteristic and the diffraction peak intensity, and it was found that a lithium-ion secondary battery having a high discharge rate characteristic could be obtained when the conditions shown below were satisfied.

Specifically, it is preferred that the peak intensity ratio A/B between the peak intensity A of Cu(200), which is the highest X-ray diffraction peak in the range where the diffraction angle (2θ) is 48° or more and 53° or less, and the peak intensity B of C(004), which is the highest X-ray diffraction peak in the range where the diffraction angle (2θ) is 52° or more and 57° or less, satisfies Expression (1) below.

$$0.3 \leq A/B \leq 1 \tag{1}$$

It is more preferred that the peak intensity ratio A/B satisfies Expression (3) below.

$$0.4 \leq A/B \leq 1 \tag{3}$$

Also, it is preferred that the peak intensity ratio C/B between the peak intensity C of Cu(220), which is the highest X-ray diffraction peak in the range where the diffraction angle (2θ) is 72° or more and 77° or less, and the intensity B of C(004), which is the highest X-ray diffraction peak in the range where the diffraction angle (2θ) is 520 or more and 570 or less, satisfies Expression (2) below.

$$0 < C/B \leq 0.5 \tag{2}$$

It is more preferred that the peak intensity ratio C/B satisfies Expression (4) below.

$$0.03 \leq C/B \leq 0.32 \tag{4}$$

According to a non-patent document, Journal of the Japan Institute of Metals, Vol. 67, No. 7 (2003), 342-347, "Thermal Stability and Internal Stress of Strongly Oriented Cu Films" (hereinafter referred to as Document 1), when an unoriented Cu film is heat-treated, the Cu(111), Cu(200) and Cu(220) peaks become stronger depending on the heat treatment temperature, and the electrical resistance of the Cu film decreases. It also teaches that with highly oriented Cu(111) films, the Cu(200) and Cu(220) peaks are not observed by normal measurement methods and the Cu(111) peak intensity does not change even after a heat treatment is performed, and that a constant low resistance value is exhibited regardless of the heat treatment.

According to a non-patent document, Journal of the Society of Materials Science, Japan, Vol. 56, No. 10 (2007), 907-912 "Effect of Micro Texture of Electroplated Copper Thin Films on Their Mechanical Properties" (hereinafter referred to as Document 2), the (111) crystal plane, which is the most dense plane of the copper crystal, tends to grow preferentially during the copper plated film growing process, but it is stated that the crystal orientation may not be constant even if the plating conditions are the same.

According to an in-depth study by the present inventors, the peak of Cu(111) is strong, but the peak intensity is too large and it is difficult to correlate between the change in peak intensity and the discharge rate characteristic. As described in Document 2 above, the peak intensity of Cu(111) is likely to vary. On the other hand, it was found that the peaks of Cu(200) and Cu(220) show less variation and show a certain correlation with the discharge rate characteristic.

In order to reduce the variation of the peak intensities depending on the measurement conditions, the peak intensities of Cu(200) and Cu(220) were divided by the intensity of C(004), which is a non-copper peak and has a similar intensity to the peak intensities of Cu(200) and Cu(220), and it was then possible to use, as an index that is less likely to depend on the measurement conditions, the peak intensities of Cu(200) and Cu(220) peaks as an index of crystallinity, and to find a correlation with the discharge rate characteristic.

When A/B is smaller than 0.3 for the peak of Cu(200), the electrical resistance of the conductive layer 12 increases due to the low crystallinity of the conductive layer 12, and the discharge rate characteristic decreases due to an increased internal resistance of the electrode 100 for power storage devices.

On the other hand, also when A/B is greater than 1, the discharge rate characteristic decreases. The reason for this is unknown at present. Since Document 1 above shows that the electrical resistance of the unoriented copper film decreases and maintains a constant value as the peak intensity of Cu(200) increases, it is unlikely that the electrical resistance of the conductive layer 12, which has once decreased, will increase as the peak intensity of Cu(200) increases. The decrease in the discharge rate characteristic is believed to be due to factors other than the electrical resistance of the conductive layer 12.

For Cu(220), as long as the peak can be observed, that is, if C/B is 0 or more, the discharge rate characteristic is relatively high. On the other hand, if C/B exceeds 0.5, the discharge rate characteristic may decrease. As with the peak of Cu(200), the reason for this is unknown at present.

As described below, regardless of the method for manufacturing the conductive layer 12, as long as the relationships of Expressions (1) to (4) are satisfied, the electrode 100 for power storage devices of the present embodiment can exhibit an excellent discharge rate characteristic.

The electrode 100 for power storage devices can be produced, for example, by the following method.

First, the resin layer 11 of a material as described above is prepared, and the conductive layer 12 is formed on the resin layer 11.

There is no particular limitation on the method for forming the conductive layer 12, and it may be formed by any of various methods used in the semiconductor thin film technology. Specifically, it may be formed by a vapor deposition method such as vacuum deposition or sputtering, or by a plating method such as electrolytic plating or electroless plating. When the conductive layer 12 includes two or more metal films, the two or more metal films may be formed by the same method or by different methods.

For example, the conductive layer 12 can be formed by forming a nickel-chromium (NiCr) seed layer on the surface of the resin layer 11 by sputtering, and then forming a copper film on the seed layer by electrolytic plating. After the formation of the conductive layer 12, the conductive layer 12 may be heat-treated at a temperature of about 50° C. to about 250° C., for example.

Thereafter, the active material layer 20 is formed on the conductive layer 12. The graphite, conductive aid and binder described above are prepared, and a solvent is added to prepare a slurry. For the solvent, various solvents that can be used for the negative electrode compound of the power storage device can be used. The formed slurry is placed on the conductive layer 12 using a doctor blade, screen printing, or the like.

The slurry is dried, and pressure is applied to the obtained active material layer 20 for density adjustment, etc., of the active material layer 20. Thus, electrode 100 for power storage devices can be obtained.

The electrode for power storage devices of the present embodiment includes graphite as an active material. Because graphite is a material suitable for absorbing/releasing lithium ions, the electrode for power storage devices of the present embodiment is suitable for use as the negative electrode of a lithium-ion secondary battery. In other words, the electrode for power storage devices of the present embodiment can be combined with positive electrodes including various positive electrode active materials to realize lithium-ion secondary batteries. In addition to lithium-ion secondary batteries, the electrode for power storage devices of the present embodiment can also be used as the negative electrode of sodium-ion secondary batteries. It is also possible to use the electrode for power storage devices of the present embodiment as a positive electrode by selecting an active material of an appropriate redox potential.

Although the electrode for power storage devices of the present embodiment satisfies any of the relations of Expression (1) to Expression (4), this does not mean that only an electrode for power storage devices that is actually confirmed to satisfy any of Expression (1) to Expression (4) by the X-ray diffraction method is the present embodiment. For example, if it is confirmed that any of the relationships of Expression (1) to Expression (4) is satisfied by manufacturing the electrode for power storage devices of the present embodiment a plurality of times under the same conditions, and it can be reasonably determined that any of the relationships of Expression (1) to Expression (4) is satisfied by fabricating under the same conditions, an electrode for power storage devices that has been produced under the same conditions and has not been measured by the X-ray diffraction method is also an electrode for power storage devices of the present embodiment.

With the electrode for power storage devices of the present embodiment, the current collector 10 includes the conductive layer 12 only on one side of the resin layer 11. However, the current collector 10 may include conductive layers on two surfaces of the resin layer 11 that are located on opposite sides of each other. With the electrode for power storage devices of the present embodiment, an active material layer may further be arranged on each of the two conductive layers.

Second Embodiment

An embodiment of the lithium-ion secondary battery of the present embodiment will be described.

Figure 5:
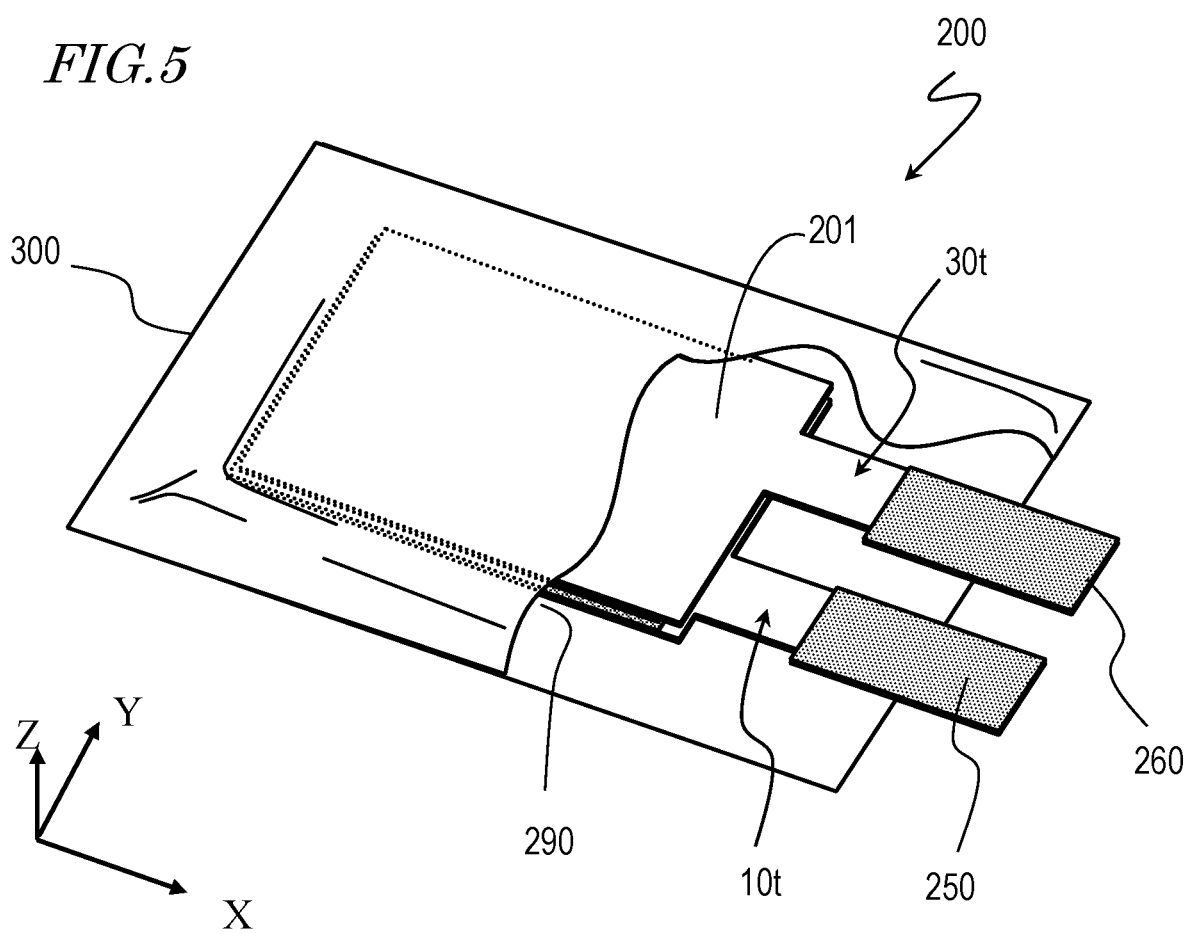
FIG. 5 is a partially cut-away perspective view showing an example of a lithium-ion secondary battery of the present embodiment.
Figure 6:
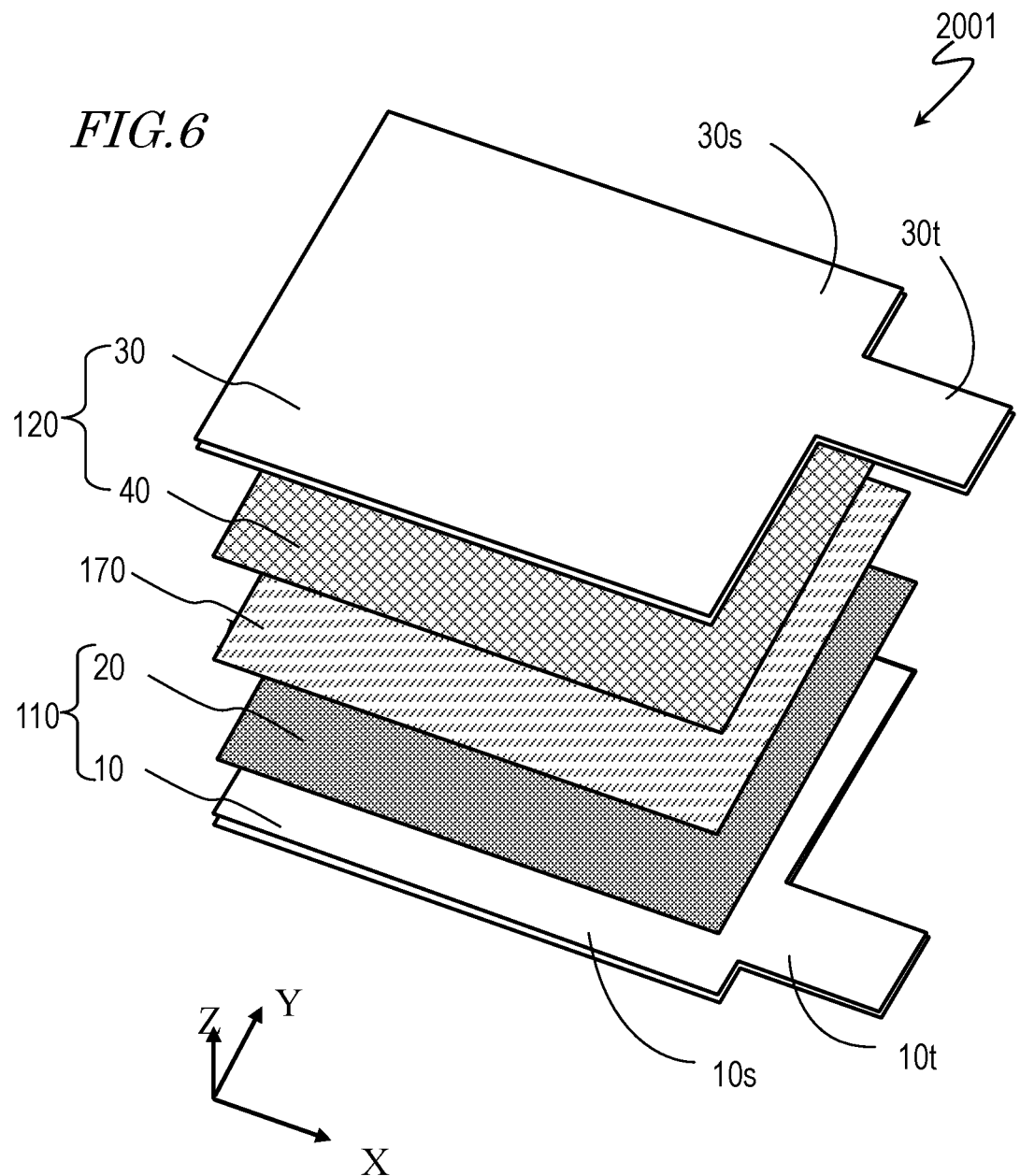
FIG. 6 is an exploded perspective view of the lithium-ion secondary battery shown in FIG. 5.

FIG. 5 is a schematic external view showing an example of a lithium-ion secondary battery 200, and FIG. 6 is an exploded perspective view showing a cell in the lithium-ion secondary battery shown in FIG. 5 taken out. Herein, a lithium-ion secondary battery referred to as a pouch type or a laminated type is illustrated as the lithium-ion secondary battery. The lithium-ion battery shown in the figure is a single layer type, but it may also be a laminated type. In the illustrated example, the positive electrode, the separator and the negative electrode of the cell are stacked together in the Z direction in the figure.

The lithium-ion secondary battery 200 includes a cell 201, a pair of leads 250 and 260 connected to the cell 201, an outer body 300 covering the cell 201 and an electrolyte 290.

The cell 201 includes a negative electrode 110, a positive electrode 120 and a separator 170 arranged between the negative electrode 110 and the positive electrode 120. In the illustrated example, the cell 201 is a single-layer cell including a pair of electrodes.

As the negative electrode 110, the electrode 100 for power storage devices described in the embodiment above can be used. The negative electrode 110 includes the current collector 10 and the active material layer 20 as described with reference to FIG. 1 and FIG. 2. That is, the negative electrode 110 satisfies the relationship of Expressions (1) to (4) above.

The positive electrode 120 includes a current collector 30 and an active material layer 40. The current collector 30 includes a resin layer and a conductive layer, as does the current collector 10 of the negative electrode. The resin layer is composed of the same material as the resin layer 11, for example. The conductive layer is, for example, an aluminum film containing aluminum or an alloy film containing aluminum.

The active material layer 40 includes an active material. Specifically, the active material layer 40 includes a composite metal oxide containing lithium. For example, it may be lithium cobaltate ($LiCoO_2$), lithium nickelate ($LiNiO_2$), lithium manganate ($LiMnO_2$), lithium manganese spinel ($LiMn_2O_4$), lithium vanadium compound ($LiV_2O_5$), olivine-type $LiMPO_4$ (where M is at least one element selected from the group consisting of Co, Ni, Mn, Fe, Mg, Nb, Ti, Al and Zr or vanadium oxide), lithium titanate ($Li_4Ti_5O_{12}$), a composite metal oxide denoted by the general formula: $LiNi_xCo_yMn_zMaO_2$ ($x+y+z+a=1$, $0 \leq x < 1$, $0 \leq y < 1$, $0 \leq z < 1$, $0 \leq a < 1$, where M in the general formula is one or more element selected from the group consisting of Al, Mg, Nb, Ti, Cu, Zn and Cr), a composite metal oxide denoted by the general formula: $LiNi_xCo_yAl_zO_2$ ($0.9 < x+y+z < 1.1$), etc.

The current collector 10 includes a second portion 10t where the active material layer 20, which functions as a tab, is absent, and a lead 250 is provided in the second portion 10t. Similarly, the current collector 30 includes a second portion 30t where the active material layer 40, which functions as a tab, is absent, and a lead 260 is provided in the second portion 30t. A portion of the lead 250 and a portion of the lead 260 are located outside the outer body 300.

The electrolyte 290 is further arranged in the inner space of the outer body 300. The electrolyte 290 is, for example, a non-aqueous electrolyte. When a non-aqueous electrolyte is applied to the electrolyte 290, typically a sealing material (e.g., a resin film such as polypropylene, not shown in FIG. 5) is arranged between the outer body 300 and the lead 250 and between the outer body 300 and the lead 260 to prevent leakage of the electrolyte.

The lithium-ion secondary battery 200 can be manufactured by the following method, for example. First, the negative electrode 110 is produced as described in the embodiment above. The positive electrode 120 is also produced by the same method.

Then, the negative electrode 110 and the positive electrode 120 are held so that the active material layers face each other with the separator 170 therebetween, and inserted into the space of the outer body 300. By arranging the electrolyte 290 in the space of the outer body 300 and sealing the outer body 300, the lithium-ion secondary battery 200 is completed.

With the lithium-ion secondary battery 200, as described in the first embodiment, a high discharge rate characteristic can be achieved by the negative electrode 110 satisfying any of the relationships of Expressions (1) to (4) above.

Experimental Example

1. Production of Samples

Electrodes for power storage devices and lithium-ion secondary batteries were produced under various conditions, and the results of measurement of crystallinity and discharge rate characteristic will now be described.

[Production of Electrodes for Power Storage Devices of Samples 1 to 8 and Samples 11 to 17]

Samples 1 to 8 and samples 11 to 17 were produced as electrodes for power storage devices as described in the first embodiment. The thickness of the active material layer, the thickness of the conductive layer, and the thickness of the resin layer are as shown in Table 2 and Table 3. The manufacturing method of the conductive layer 12 of the electrodes for power storage devices of samples 1 to 8 and samples 11 to 17 is as follows.

[Method for Manufacturing Conductive Layer 12]

A Cu seed layer of 0.05 μm was formed in an argon gas atmosphere using the sputtering method on a resin layer having the thickness shown in Table 2, 3. Then, the Cu seed layer was electroplated under the following conditions to form a Cu plating layer. By performing the process of forming a Cu plating layer, the Cu seed layer is integrated with the Cu plating layer to become a Cu conductive layer.

Sample 1: Plating current density: 1.5 A/dm², plating time: 60 seconds

Sample 2: Plating current density: 2.0 A/dm², plating time: 45 sec

Sample 3: Plating current density: 2.5 A/dm², plating time: 35 sec

Sample 4: Plating current density: 3.0 A/dm², plating time: 30 sec

Sample 5: Plating current density: 3.5 A/dm², plating time: 50 sec

Sample 6: Plating current density: 4.0 A/dm², plating time: 35 sec

Sample 7: Plating current density: 4.5 A/dm², plating time: 45 sec sample 8: plating current density: 5.0 A/dm², plating time: 40 sec sample 11: plating current density: 2.0 A/dm², plating time: 45 sec Sample 12: Plating current density: 2.5 A/dm², plating time: 35 sec Sample 13: Plating current density: 3.0 A/dm², plating time: 30 sec Sample 14: Plating current density: 3.5 A/dm², plating time: 50 sec Sample 15: Plating current density: 4.0 A/dm², plating time: 35 sec Sample 16: Plating current density: 4.5 A/dm², plating time: 20 sec Sample 17: Plating current density: 5.0 A/dm², plating time: 40 sec

TABLE 2

| | Active material layer [μm] | Current collector Conductive layer [μm] | Current collector Resin layer [μm] | Peak intensity (A) (cps) | Peak intensity (B) (cps) | Peak intensity (C) (cps) | A/B | C/B | Discharge rate (5C) capacity retention rate (relative value) |
|---|---|---|---|---|---|---|---|---|---|
| Sample 1 | 106 | 0.3 | 6 | 12135 | 45964 | 976 | 0.26 | 0.021 | 110 |
| Sample 2 | 106 | 0.3 | 6 | 14135 | 47964 | 1223 | 0.29 | 0.025 | 118 |
| Sample 3 | 106 | 0.3 | 4 | 19428 | 48354 | 1472 | 0.40 | 0.030 | 122 |
| Sample 4 | 106 | 0.3 | 5 | 22561 | 48946 | 2317 | 0.46 | 0.047 | 123 |
| Sample 5 | 106 | 0.5 | 5 | 45714 | 57538 | 8090 | 0.79 | 0.14 | 133 |
| Sample 6 | 106 | 0.4 | 4 | 42783 | 60342 | 19226 | 0.71 | 0.32 | 129 |
| Sample 7 | 106 | 0.6 | 6 | 63918 | 64529 | 32158 | 0.99 | 0.50 | 123 |
| Sample 8 | 106 | 0.6 | 4 | 69013 | 62357 | 34191 | 1.11 | 0.55 | 100 |

TABLE 3

| | Active material layer [μm] | Current collector Conductive layer [μm] | Current collector Resin layer [μm] | Peak intensity (A) (cps) | Peak intensity (B) (cps) | Peak intensity (C) (cps) | A/B | C/B | Discharge rate (5C) capacity retention rate (relative value) |
|---|---|---|---|---|---|---|---|---|---|
| Sample 11 | 52 | 0.3 | 4 | 14193 | 38651 | 1012 | 0.37 | 0.026 | 113 |
| Sample 12 | 52 | 0.3 | 4 | 16653 | 39873 | 1259 | 0.42 | 0.032 | 114 |
| Sample 13 | 52 | 0.3 | 4 | 21782 | 40946 | 2460 | 0.53 | 0.060 | 115 |
| Sample 14 | 52 | 0.5 | 5 | 40687 | 47215 | 9103 | 0.86 | 0.19 | 117 |
| Sample 15 | 52 | 0.4 | 5 | 37373 | 40797 | 10226 | 0.92 | 0.25 | 119 |
| Sample 16 | 52 | 0.3 | 6 | 38451 | 40021 | 12458 | 0.96 | 0.31 | 115 |
| Sample 17 | 52 | 0.6 | 4 | 45972 | 41083 | 14784 | 1.12 | 0.36 | 100 |

[Production of Lithium-Ion Batteries of Samples 1 to 8 and Samples 11 to 17]

Lithium-ion secondary batteries were produced as described in the second embodiment using the electrodes for power storage devices of Samples 1 to 8 and Samples 11 to 17. Lithium cobaltate ($LiCoO_2$) was used as the positive electrode active material.

2. Measurement

[Measurement of rate characteristic] The lithium-ion batteries of Samples 1 to 8 and Samples 11 to 17 were first charged by constant-current charging at a charge rate of 0.2 C (the current value at which charging completes in 5 hours when constant-current charging is performed at 25° C.) until the battery voltage reaches 4.2 V, using a secondary battery charge/discharge test equipment (from Hokuto Denko Co., Ltd.). After that, the battery was discharged by constant-current charging at a discharge rate of 0.2 C until the battery voltage reaches 2.8 V to determine the initial discharge capacity C1.

Then, charging was performed by constant-current charging at a charging rate of 0.2 C (the current value at which charging completes in 5 hours when constant-current charging is performed at 25° C.) until the battery voltage reaches 4.2 V. Discharging was performed by constant-current discharging at a discharge rate of 5 C (the current value at which charging completes in 0.2 hours when constant-current charging is performed at 25° C.) until the battery voltage reaches 2.8 V to determine the 5 C discharge capacity C5.

From the initial discharge capacity C1 and the 5 C discharge capacity C5, the 5 C rate characteristic was determined according to the expression below.

5 C rate characteristic [%]=C5/C1×100

For Samples 1 to 7, the 5 C rate characteristic was determined, as the capacity retention rate, with the 5 C rate characteristic of Sample 8 being 100. For Samples 11 to 16, the 5 C rate characteristic was calculated, as the capacity retention rate, with the 5 C rate characteristic of sample 17 being 100. The results are shown in Tables 2 and 3.

[Measurement by X-Ray Diffraction Method]

The lithium-ion secondary batteries of Samples 1 to 8 and Samples 11 to 17, whose rate characteristic had been measured, were disassembled after discharging to the discharge voltage, and the electrodes for power storage devices of Samples 1 to 8 and Samples 11 to 17, which are negative electrodes, were taken out. After washing and drying the removed electrodes for power storage devices with DMC (dimethyl carbonate), the crystallinity of the conductive layer was measured using the X-ray diffraction method for the electrodes for power storage devices of Samples 1 to 8 and Samples 11 to 17.

The apparatus used for the measurement and the measurement conditions are as follows.

Equipment name: Rigaku UltimaIV
Acceleration voltage: 40 kV
Current: 40 mA
Scan speed: 4 deg/min
Sampling width: 0.02 deg The C(004), Cu(200), and Cu(220) peaks were identified for each sample from the obtained X-ray diffraction chart, and the peak intensity A of Cu(200), the peak intensity B of C(004) and the peak intensity C of Cu(220) were determined, and the values of A/B and C/B were calculated. Table 2 and Table 3 show the peak intensities A, B and C, and the values of A/B and C/B.

3. Results and Discussion

Figure 7:
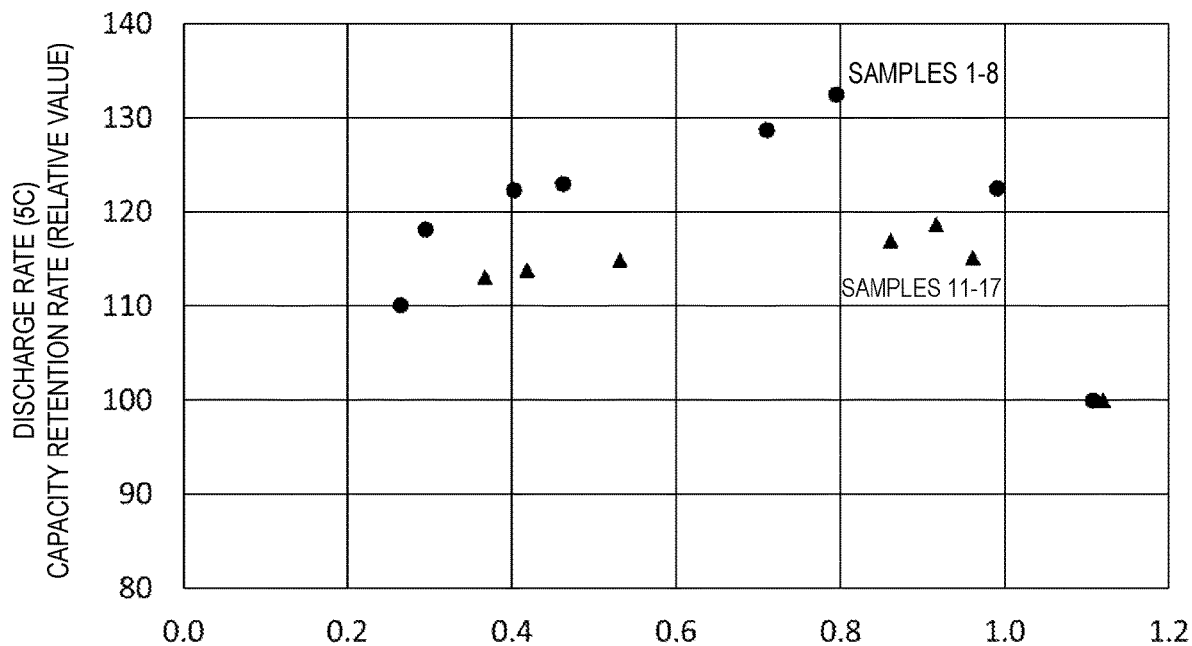
FIG. 7 is an example showing the relationship between A/B and the discharge rate characteristics for Samples 1 to 8 and Samples 11 to 17 according to an experimental example.
Figure 8:
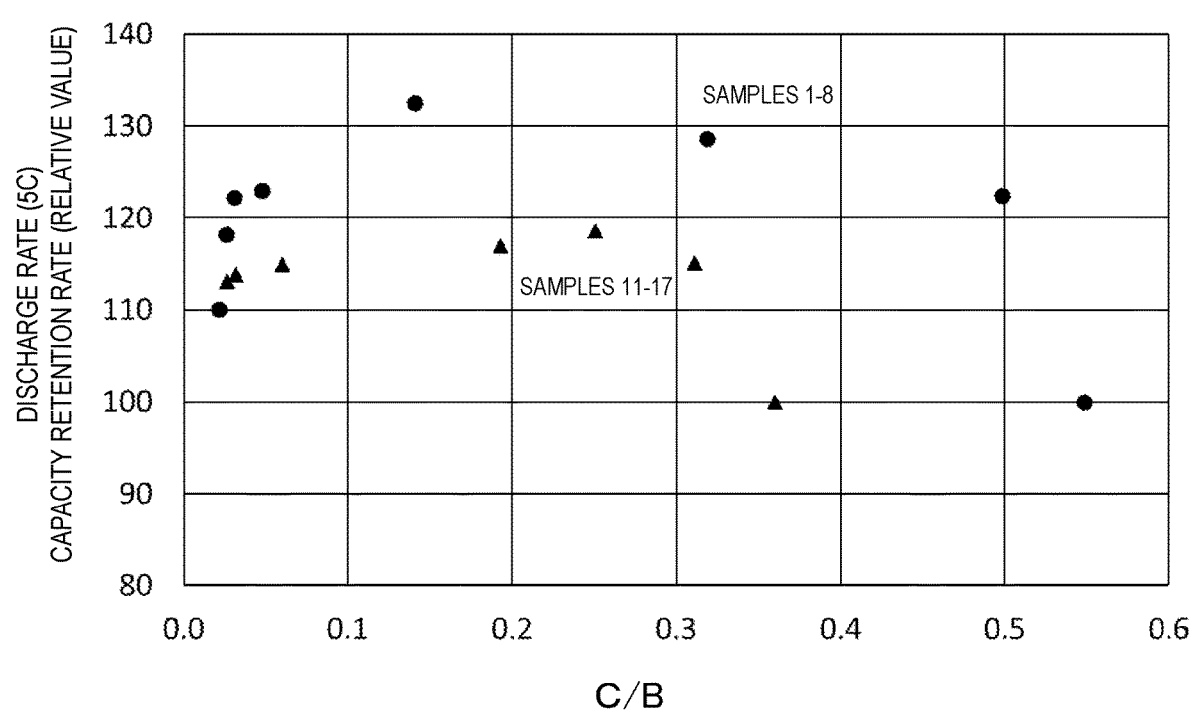
FIG. 8 is an example showing the relationship between C/B and the discharge rate characteristics for Samples 1 to 8 and Samples 11 to 17 according to an experimental example.

FIG. 7 shows the relationship between A/B and the capacity retention rate of the discharge rate characteristic for Samples 1 to 8 and Samples 11 to 17. Similarly, FIG. 7 shows the relationship between C/B and the capacity retention rate of the discharge rate characteristic for Samples 1 to 8 and Samples 11 to 17. In FIG. 7 and FIG. 8, circles indicate data for Samples 1 to 8, and triangles indicate data for Samples 11 to 17.

From the results of Samples 1 to 8 and Samples 11 to 17, it can be seen that when the conductive layer is formed by plating, the crystallinity of the conductive layer changes by varying the current density.

From FIG. 7, it can be seen that the discharge rate characteristic improves as the value of A/B increases from 0, and the discharge rate characteristic decreases as A/B becomes about 1 or more. Document 1 identified above, etc., teach that the electrical resistance of the copper film decreases as the peak intensity of Cu(200) increases, and it is believed that the result in FIG. 7 shows that while A/B is up to about 1, the crystallinity of the conductive layer increases and the electrical resistance of the conductive layer decreases, thereby lowering the internal resistance of the lithium-ion secondary battery, thus improving the discharge rate characteristic.

On the other hand, when the value of A/B becomes larger than about 1, the discharge rate characteristic decreases. As explained in the embodiments, the reason for this is unknown at present.

The discharge rate characteristics of Samples 1 to 7 as a whole are larger than the discharge rate characteristics of Samples 11 to 16. However, they have generally the same tendency of the discharge rate characteristic changing against A/B. It is believed from FIG. 7 that a generally good discharge rate characteristic can be expected if A/B is 0.3 or more and 1.0 or less, and an even better discharge rate characteristic can be expected if A/B is 0.4 or more and 1.0 or less.

In this experimental example, by forming a conductive layer by plating at a current density of 2.0 A/dm$^2$ or more and 4.5 A/dm$^2$ or less, A/B was 0.3 or more and 1.0 or less, and by forming a conductive layer by plating at a current density of 2.5 A/dm$^2$ or more and 4.0 A/dm$^2$ or less, A/B was 0.4 or more and 1.0 or less.

It can be seen from FIG. 8 that for Samples 1 to 8, the discharge rate characteristic improves as the value of C/B increases from 0, and the discharge rate characteristic decreases as C/B becomes about 0.5 or more. As with A/C, it is believed that while C/B is 0 to about 0.5, the crystallinity of the conductive layer increases and the electrical resistance of the conductive layer decreases, thereby lowering the internal resistance of the lithium-ion secondary battery, thus improving the discharge rate characteristic. The reason why the discharge rate characteristic decreases when the value of C/B becomes larger than about 0.5 is unknown at present.

On the other hand, for Samples 11 to 17, it can be seen that the discharge rate characteristic improves as the value of C/B increases from 0, and the discharge rate characteristic decreases when C/B becomes about 0.3 or more. For Samples 11 to 17, the discharge rate characteristic decreases as C/B becomes about 0.3 or more, but the reason for this is unknown at present.

From FIG. 8, it can be expected that a generally good discharge rate characteristic can be obtained when C/B is between 0.0 or more and 0.5 or less, and an even better discharge rate characteristic can be expected when C/B is 0.03 or more and 0.32 or less.

In this experimental example, by forming a conductive layer by plating at a current density of 4.5 A/dm$^2$ or less, C/B was 0.0 or more and 0.5 or less, and by forming a conductive layer by plating at a current density of 2.5 A/dm$^2$ or more and 4.0 A/dm$^2$ or less, C/B was 0.03 or more and 0.32 or less.

Note that in this example, the crystallinity of the conductive layer is changed by varying the current density, but it is believed that it is also possible to change the crystallinity and the electrical resistance of the conductive layer by heat treatment, as shown in Document 1 identified above. That is, it is believed that the relationship between the values of A/B and C/B and the discharge rate characteristic is not limited to the specific manufacturing method of the conductive layer.

INDUSTRIAL APPLICABILITY

The electrode for power storage devices according to the embodiments of the present disclosure is applicable to power sources for various electronic devices, electric motors, and the like. For example, the power storage device according to the embodiments of the present disclosure is applicable to power sources for vehicles such as bicycles and passenger cars, power sources for communication devices such as smartphones, power sources for various sensors, and power sources for powering unmanned eXtended Vehicles (UxV).

REFERENCE SIGNS LIST

10 Current collector
10$t$ Second area
11 Resin layer
12 Conductive layer
20 Active material layer
20$s$ First portion
20$t$, 30$t$ Second portion
30 Current collector
40 Active material layer
100 Electrode for power storage device
110 Negative electrode
120 Positive electrode
170 Separator
200 battery for lithium-ion secondary
201 Cell
250 Lead
260 Lead
290 Electrolyte
300 Outer body

The invention claimed is:

1. An electrode for power storage devices, the electrode comprising:
   a resin layer;
   a conductive layer containing copper and being disposed on the resin layer; and
   an active material layer containing graphite and being disposed on the conductive layer,
   wherein when measured by an X-ray diffraction method from a surface of the active material layer, a peak intensity ratio A/B between an intensity A at a highest X-ray diffraction peak in a range where a diffraction angle (2θ) is 48° or more and 53° or less and an intensity B at a highest X-ray diffraction peak in a range where a diffraction angle (2θ) is 52° or more and 57° or less satisfies Expression (1) below:

$$0.3 \leq A/B \leq 1 \qquad (1).$$

2. An electrode for power storage devices, the electrode comprising:
a resin layer;
a conductive layer containing copper and being disposed on the resin layer; and
an active material layer containing graphite and being disposed on the conductive layer,
wherein when measured by an X-ray diffraction method from a surface of the active material layer, a peak intensity ratio C/B between an intensity C at a highest X-ray diffraction peak in a range where a diffraction angle (2θ) is 72° or more and 77° or less and an intensity B at a highest X-ray diffraction peak in a range where a diffraction angle (2θ) is 52° or more and 57° or less satisfies Expression (2) below:

$$0 < C/B \leq 0.5 \tag{2}$$

3. The electrode for power storage devices according to claim 1, wherein the conductive layer has a thickness of 0.2 μm or more and 2.0 μm or less.

4. The electrode for power storage devices according to claim 1, wherein:
the peak intensity ratio A/B satisfies Expression (3) below:

$$0.4 \leq A/B \leq 1 \tag{3}$$

5. The electrode for power storage devices according to claim 2, wherein:
the peak intensity ratio C/B satisfies Expression (4) below:

$$0.03 \leq C/B \leq 0.32 \tag{4}$$

6. The electrode for power storage devices according to claim 1, wherein when measured by an X-ray diffraction method from a surface of the active material layer, the electrode for power storage devices has an X-ray diffraction peak, at which an intensity is higher than the intensity A and an intensity C at a highest X-ray diffraction peak in a range where a diffraction angle (2θ) is 72° or more and 77° or less, in a range where a diffraction angle is 41° or more and 46° or less.

7. The electrode for power storage devices according to claim 1, wherein the resin layer includes at least one of polyethylene terephthalate, polypropylene, polyamide, polyimide, polyethylene, polystyrene, phenolic resin and epoxy resin.

8. A lithium-ion secondary battery comprising:
an electrode for power storage devices according to claim 1 as a negative electrode;
a positive electrode including a positive electrode active material layer and a positive electrode current collector;
a separator arranged between the negative electrode and the positive electrode; and
a non-aqueous electrolyte including lithium ions.

9. The electrode for power storage devices according to claim 2 wherein the conductive layer has a thickness of 0.2 μm or more and 2.0 μm or less.

10. The electrode for power storage devices according to claim 2, wherein when measured by an X-ray diffraction method from a surface of the active material layer, the electrode for power storage devices has an X-ray diffraction peak, at which an intensity is higher than the intensity A and the intensity C, in a range where a diffraction angle is 41° or more and 46° or less.

11. The electrode for power storage devices according to claim 2, wherein the resin layer includes at least one of polyethylene terephthalate, polypropylene, polyamide, polyimide, polyethylene, polystyrene, phenolic resin and epoxy resin.

12. A lithium-ion secondary battery comprising:
an electrode for power storage devices according to claim 2 as a negative electrode;
a positive electrode including a positive electrode active material layer and a positive electrode current collector;
a separator arranged between the negative electrode and the positive electrode; and
a non-aqueous electrolyte including lithium ions.

* * * * *